(12) United States Patent
Sato

(10) Patent No.: US 6,643,094 B2
(45) Date of Patent: Nov. 4, 2003

(54) MAGNETIC HEAD DEVICE INCLUDING A GUIDE RECESS FOR GUIDING LEAD WIRES

(75) Inventor: Makoto Sato, Iwata-gun (JP)

(73) Assignee: Minebea Co., Ltd., Miyota (JP)

( * ) Notice: Subject to any disclaimer, the term of this patent is extended or adjusted under 35 U.S.C. 154(b) by 194 days.

(21) Appl. No.: 09/911,535

(22) Filed: Jul. 25, 2001

(65) Prior Publication Data

US 2002/0015257 A1 Feb. 7, 2002

(30) Foreign Application Priority Data

Jul. 31, 2000 (JP) ........................................ 2000-232018

(51) Int. Cl.[7] ................................................ G11B 5/17
(52) U.S. Cl. .......................................... 360/123; 360/125
(58) Field of Search ................................. 360/125, 123

(56) References Cited

U.S. PATENT DOCUMENTS

| | | | | |
|---|---|---|---|---|
| 4,879,620 A | * | 11/1989 | Yamashita | 360/123 |
| 5,148,342 A | * | 9/1992 | Kato | 360/121 |
| 5,402,397 A | * | 3/1995 | Ohmori et al. | 369/13.12 |
| 5,459,629 A | * | 10/1995 | Wakasugi | 360/246.2 |
| 5,497,283 A | * | 3/1996 | Kato | 360/123 |
| 5,629,821 A | * | 5/1997 | Wakasugi et al. | 360/125 |
| 5,889,642 A | * | 3/1999 | Egawa et al. | 360/125 |
| 5,963,402 A | * | 10/1999 | Egawa et al. | 360/125 |
| 6,075,681 A | * | 6/2000 | Egawa et al. | 360/128 |

FOREIGN PATENT DOCUMENTS

| | | | | |
|---|---|---|---|---|
| JP | A 11-53707 | | 2/1999 | |
| JP | 11053707 A | * | 2/1999 | G11B/5/17 |

\* cited by examiner

Primary Examiner—Brian E. Miller
(74) Attorney, Agent, or Firm—Oliff & Berridge, PLC

(57) ABSTRACT

A magnetic head device is provided which can guide lead wires without increasing its dimension. A guide recess having a depth of 0.1 to 0.5 mm is formed in an end face of a terminal block, so that the lead wires can pass therethrough for connection to terminal pins. The lead wires do not protrude from the end face of the terminal block. As a projection for guiding lead wires is not provided unlike a prior art, there is no problem with a floppy disk contacting with the projection, whereby a risk that a sliding portion against the floppy disk or the floppy disk itself is damaged or broken can be avoided. The lead wires are guided clear of a cutout and can be prevented from getting broken when a bobbin with terminals is set in a shield ring.

5 Claims, 5 Drawing Sheets

MAGNETIC HEAD DEVICE INCLUDING A GUIDE RECESS FOR GUIDING LEAD WIRES

BACKGROUND OF THE INVENTION

1. Field of the Invention

The present invention relates to a magnetic head device for use in floppy disk devices or the like.

2. Description of the Related Art

In a magnetic recording method in which a leakage flux from a magnetic recording medium is introduced from a gap into a magnetic head including a coil for a readback process, a magnetic flux is also introduced into a magnetic head core due to an external magnetic field from a motor, a power supply or the like, and noise may be generated by the magnetic flux causing errors.

To cope with the above noise, there are provided various types of magnetic head devices in which a shield ring (shield portion) made of a magnetic material such as ferrite or permalloy is disposed at an outer circumference of a magnetic head core in order to guide magnetic fluxes from external magnetic fields into the shield ring thereby preventing the magnetic fluxes from going into the magnetic head core.

As one example of the aforesaid type of magnetic head devices, there is a magnetic head device in which a magnetic head core, a slider, and a coil wound on a bobbin are disposed in a shield ring, a terminal block having terminal pins to which lead wires of the coil are connected is formed integrally with the bobbin at one end of a narrow extension whose width is smaller than the width of a flange of the bobbin, the narrow extension of the bobbin fits in a slit of the shield ring to thereby allow the terminal block to be disposed outside the shield ring, and the slit of the shield ring is kept to a minimum size required to eliminate the influence of external noise.

As one example of a bobbin and a terminal block integrated with the bobbin for use in such a magnetic head device as described above (hereinafter referred to as "integration bobbin"), the inventor of this application disclosed an integration bobbin in Japanese Patent Application Laid-open No. Hei 11-53707. The integration bobbin will be described with reference to FIG. 7.

In FIG. 7, lead wires 53 from a coil 52 on a bobbin proper 51 of the integration bobbin 50 are guided toward a terminal block 56 passing over a narrow extension 55 extending from a bobbin flange 54 formed at one end of the bobbin proper 51. The bobbin flange 54, the narrow extension 55 and the terminal block 56 are integrally formed. The width of the narrow extension 55 is made slightly larger than the width of a slit (opening portion) in a shield ring (not shown).

A projection 57 is provided on the terminal block 56 for guiding the lead wires 53. The lead wires 53 from the coil 52 are bound on respective terminal pins 58a to 58c by way of the projection 57.

In recent years, magnetic disk devices tend to become higher in density and smaller in size, and in association with this tendency magnetic head devices for use in the magnetic disk devices have been also made smaller and thinner. In addition, the magnetic head devices are required to be constructed to allow a certain tolerance in dimensions in consideration of variance in assembly and components.

However, in the prior art shown in FIG. 7, the projection 57 is provided on the terminal block 56, which increases the longitudinal dimension of the magnetic head device, whereby a tolerance in dimension relative to a shutter of a floppy disk is reduced. Thus, depending on an accuracy of assembling magnetic head devices, there may be a risk such that the floppy disk and the projection 57 on the terminal block 56 are in contact with each other causing scratches or damages to magnetic heads of the magnetic head device or the floppy disk.

SUMMARY OF THE INVENTION

The present invention has been made in light of the above, and it is an object of the present invention to provide a magnetic head device which can achieve the same effect as the prior art devices without providing a projection for guiding lead wires.

According to a first aspect of the present invention, in a magnetic head device in which a shield ring comprises a magnetic head core, a slider and a coil wound on a bobbin, one flange of the bobbin extends (flange extension) in one direction for a predetermined length maintaining its width, a narrow extension having a smaller width than the flange extension is formed integrally on an end face of the flange extension, a terminal block having terminal pins to which lead wires of the coil are connected is formed integrally at an end of the narrow extension and in which the narrow extension of the bobbin fits in a slit provided in the shield ring making the terminal block to be positioned outside the shield ring, a guide recess for guiding the lead wires of the coil is formed on a distal end of the terminal block, and the lead wires are connected to the terminal pins through the recess.

According to a second aspect of the present invention, in the first aspect of the invention, the terminal block is of a substantially rectangular shape, the guide recess is formed on a face of the distal end of the terminal block away from the narrow extension, and the terminal pins are provided on a lower face of the terminal block, which is present on a side of an outward face of the one flange opposite to a face in contact with the coil.

According to a third aspect of the invention, in the second aspect of the invention, the narrow extension is formed such that one side thereof is recessed from one side of the flange extension thereby defining a cutout while another side thereof is flush with another side of the flange extension, and an angle θ formed between the one side of the flange extension and a line segment connecting a point defined by a side line of another flange in line with the one side of the flange extension intersecting with an end line of the another flange positioned toward the terminal block and a point defined by a bottom corner of an inlet of the guide recess toward the cutout is set to meet $\theta > \tan^{-1}(b/a)$ where a is a length of the flange extension and b is a depth of the cutout.

According to a fourth aspect of the present invention, in any of the first to third aspects of the invention, the depth of the guide recess ranges from 0.1 mm to 0.5 mm.

According to a fifth aspect of the present invention, in any of the first to third aspects of the invention, the depth of the guide recess gradually decreases from the inlet for lead wires toward the terminal pins.

According to a sixth aspect of the present invention, in any of the first to fifth aspects of the invention, the width of the guide recess is small at the inlet on a lead wire introduction side of the guide recess and gradually increases toward the terminal pins.

BRIEF DESCRIPTION OF THE DRAWINGS

The present invention will be better understood with reference to the accompanying drawings, in which.

DETAILED DESCRIPTION OF PREFERRED EMBODIMENTS

The magnetic head device of one embodiment of the present invention will be described with reference to FIGS. 1 to 6.

Figure 1:
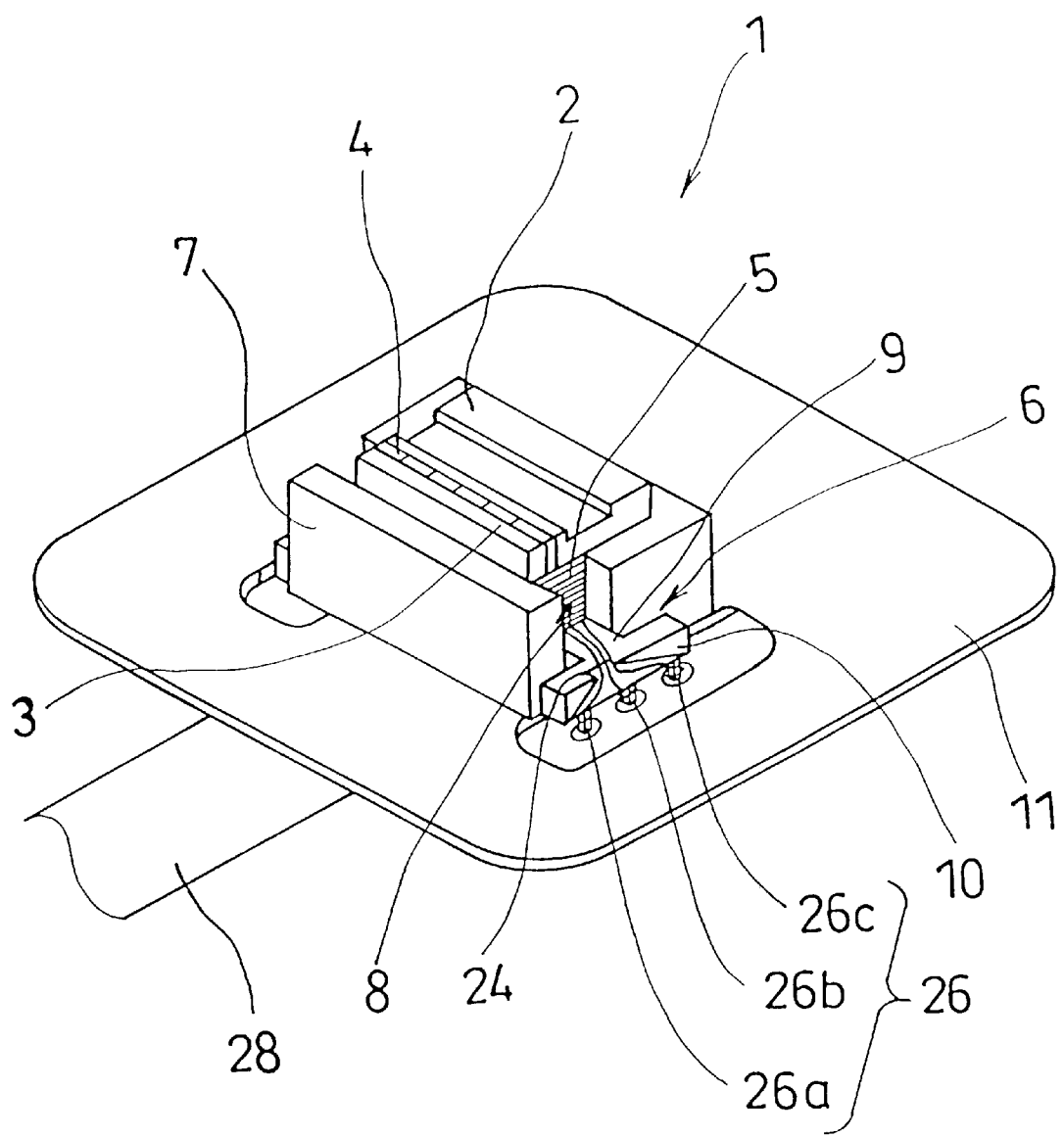
FIG. 1 is a perspective view of a magnetic head device according to one embodiment of the present invention.
Figure 2:
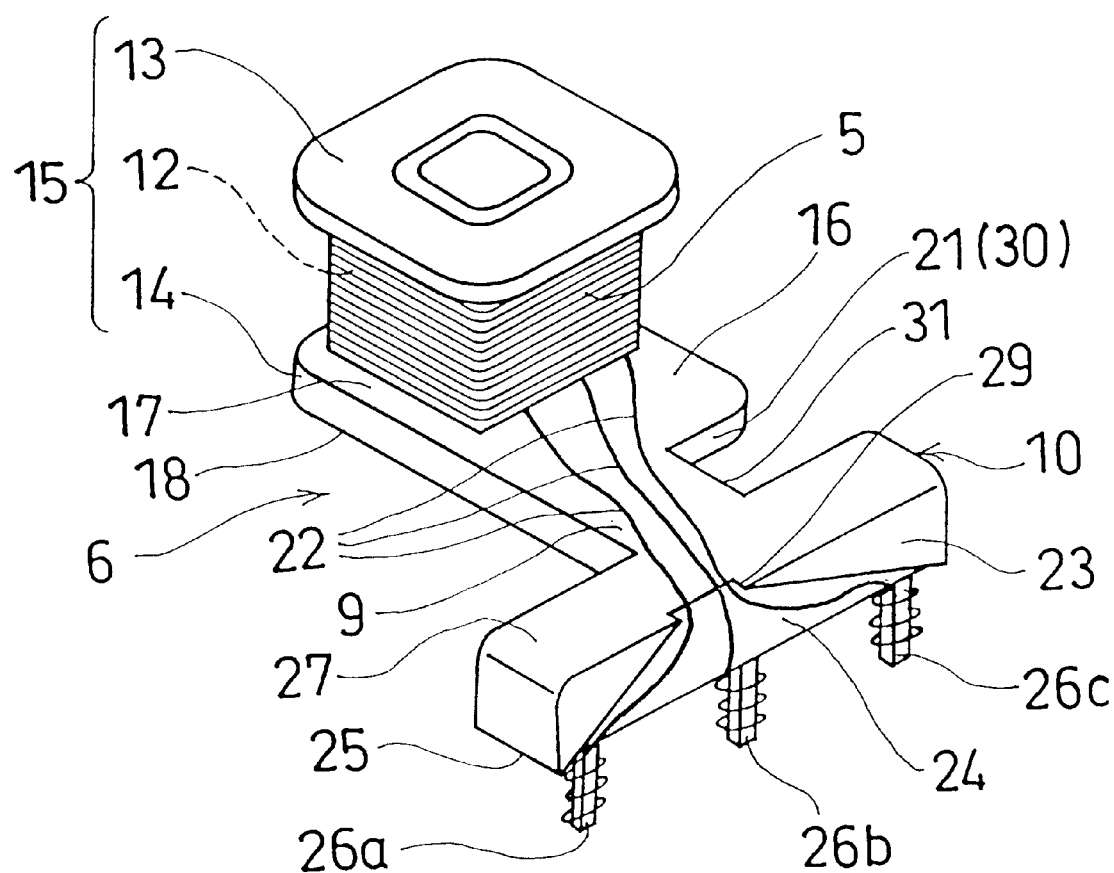
FIG. 2 is a perspective view of a bobbin with a terminal block and a coil shown in FIG. 1.

In FIGS. 1 and 2, a magnetic head device 1 has a slider 2 and a slider 3 which are both made of non-magnetic ceramics. A plurality of cores 4 (magnetic head cores) constituting a magnetic circuit are disposed between the slider 2 and the slider 3, and the cores 4 constitute a sliding surface together with the slider 2 and the slider 3. A bobbin with a terminal block (hereinafter called "integration bobbin") 6 around which a coil 5 is provided has the core 4 inserted.

A shield ring 7 is provided so as to enclose the slider 2, the slider 3, the cores 4 and the coil 5 thereby suppressing the generation of noise due to external magnetic fields. A slit 8 is formed in one side of the shield ring 7 and a narrow extension 9 (to be described hereinafter) formed on the integration bobbin 6 fits into the slit 8 in such a manner that a terminal block 10 of the integration bobbin 6 is positioned outside the shield ring 7.

The integration bobbin 6 assembled with the slider 2, the slider 3, the core 4 and the coil 5 and the shield ring 7 are mounted on a flexure 11.

Figure 3:
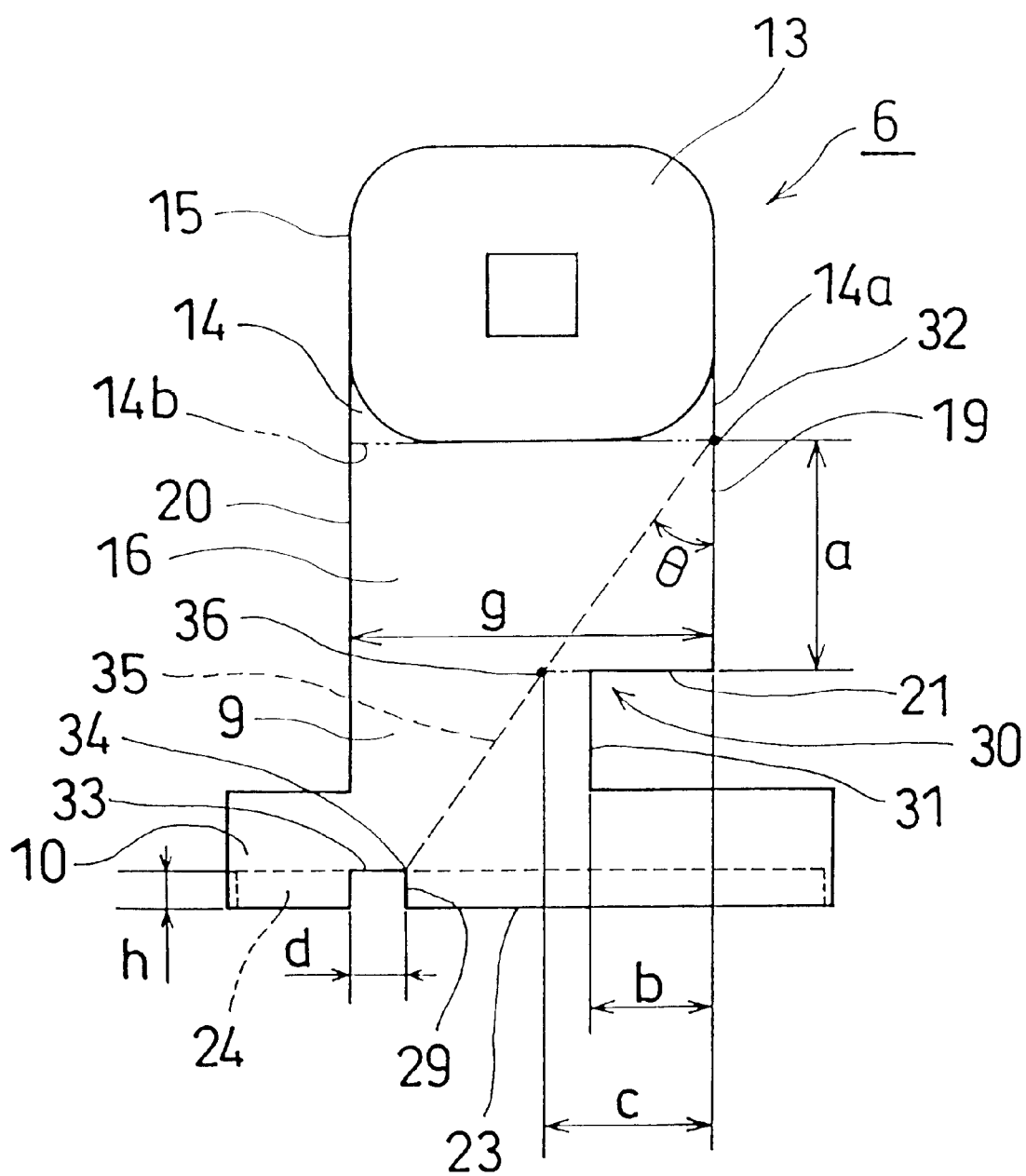
FIG. 3 is a plan view of the bobbin with a terminal block shown in FIG. 1.

As shown in FIGS. 2 and 3, the integration bobbin 6 includes a bobbin proper 15 comprising a main body 12 to have the coil 5 provided therearound and to be disposed so as to enclose the core 4 (shown in FIG. 1), an upper flange 13 formed on an upper side of the main body 12 and a lower flange 14 (one flange) formed on a lower side of the main body 12. A flange extension 16 is provided so as to extend from the lower flange 14 of the bobbin proper 15 with a width g substantially equal to the width of the lower flange 14 for a length a (predetermined length).

Hereinafter, a face of the lower flange 14, to which the coil 5 is disposed, is referred to as inward face 17 and a face opposite to the inward face 17 is referred to as outward face 18. Additionally, of two sides of the flange extension 16 running in a direction perpendicular to an end 21 thereof, one side shown on the right-hand in FIG. 3 is referred to as first side 19, and another side on the left-hand in FIG. 3 is referred to as second side 20.

The narrow extension 9, which has a smaller width than the flange extension 16 (width g), is provided extending from a portion defined by a line extended from the end 21 in such a manner that a side thereof on the left-hand in FIG. 3 is flush with the second side 20. The terminal block 10 of a rectangular shape is provided integrally on a distal end of the narrow extension 9, namely integrated with also the bobbin proper 15 and the flange extension 16, in such a manner as to have its longitudinal direction set perpendicular to the second side 20.

The length of the terminal block 10 is set to be larger than the width g of the flange extension 16. The terminal block 10 is, as hereinafter described, for connecting lead wires 22 of the coil 5 with. In this case, the diameter of the lead wire 22 is set to be 0.03 mm.

Figure 4:
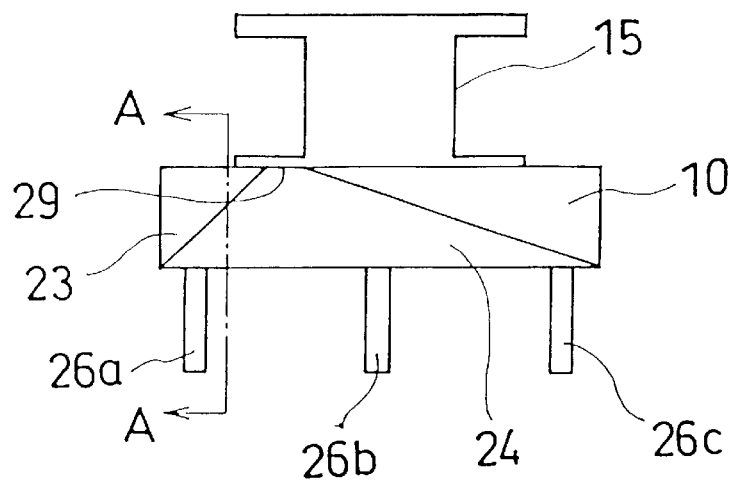
FIG. 4 is a front view of the bobbin with a terminal block shown in FIG. 1.
Figure 5:
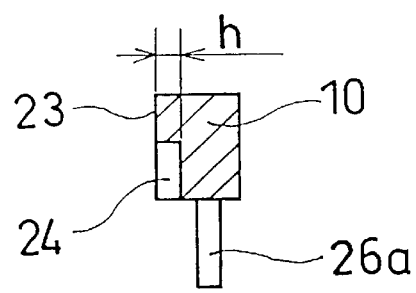
FIG. 5 is a cross-sectional view taken along the line A—A in FIG. 4.

As shown in FIGS. 3 to 5, a guide recess 24 for guiding the lead wires 22 of the coil 5 is formed in an end face 23 of the terminal block 10, which is away from the narrow extension 9.

Three terminal pins 26a, 26b, 26c (hereinafter, generically referred to as "terminal pins 26") are provided at predetermined intervals so as to stand upright from an outward face of the terminal block 10 (outward face 25 of the terminal block) which is continuous with the outward face 18 of the lower flange 14 so that the lead wires 22 of the coil 5 are bound (for connection) therearound. In this case, the lead wires 22 of the coil 5 extend to the terminal pins 26 for connection passing by an inward face of the flange extension 16 (face continuous with an inward face 17 of the lower flange 14), an inward face of the narrow extension 9 (face continuous with an inward face 17 of the lower flange 14), an inward face 27 of the terminal block 10 opposite to the outward face 25 and through the guide recess 24. One terminal pin 26b of the three terminal pins 26 is provided substantially at a central portion of the terminal block 10 with respect to its longitudinal direction, while other two terminal pins 26a, 26c are provided in the vicinity of both ends of the terminal block 10, respectively.

The terminal pins 26 of the terminal block 10 are connected to prescribed locations on a flexible printed board 28 by means of soldering or the like.

A portion of the guide recess 24 positioned at the inward face 27 and forming a cutout is hereinafter referred to as an inlet 29. The width of the inlet 29 is set to be about 0.3 to 0.5 mm. As shown in FIG. 4, the guide recess 24 increases gradually in width from the inlet 29 toward the outward face 25 where the terminal pins 26 are provided, and where the width of the guide recess 24 is substantially equal to the length of the terminal block 10. The depth h of the guide recess 24 is set at 0.1 to 0.5 mm and continues to be constant all the way from the inlet 29 to the outward face 25.

As described previously, through the existence of the narrow extension 9 whose width is narrower than the width (dimension g) of the flange extension 16, a cutout 30 is formed toward the first side 19 of the flange extension 16 of the integration bobbin 6. The dimension from the first side 19 of the flange extension 16 to one side of the narrow extension 9 (bottom 31 of the cutout 30) constitutes the depth of the cutout 30, and is set to b.

Note that in this embodiment, another side of the narrow extension 9 opposing the side of the cutout 30 (bottom 31 of the cutout 30) of the narrow extension 9 has the same plane as (namely, flush with) the second side 20 of the flange extension 16.

In addition, an angle θ formed between the first side 19 of the flange extension 16 and a line segment 35 connecting a point 32 defined by a side line 14a of the lower flange 14 in line with the first side 19 of the flange extension 16 intersecting with an end line 14b of the lower flange 14 positioned toward the terminal block 10 and a point defined by a corner 34 of an inlet bottom 33 of the guide recess 24 toward the cutout 30 is set so as to meet θ>tan$^{-1}$(b/a) where a is the length of the flange extension 16 and b is the depth of the cutout 30.

The angle θ is set as above so as to satisfy c>b, where c is the dimension from the first side 19 of the flange extension to an intersection 36 defined by an extension line of the end 21 on the first side 19 of the flange extension and the line segment 35, and is equal to a tan θ, whereby the line segment 35 does not interfere with the cutout 30. Because c is equal to a tanθ as described above, c>b means a tanθ>b, and further θ>tan$^{-1}$(b/a). Thus, the lead wires 22 can be prevented from passing the area of the cutout 30.

With the magnetic head device 1 constructed as described above, the guide recess 24 having a depth h of 0.1 to 0.5 mm is formed in the end 23 of the terminal block 10 for passing the lead wires 22 for connection to the terminal pins 26, so the lead wires 22 can be prevented from protruding from the end 23 of the terminal block 10.

Figure 7:
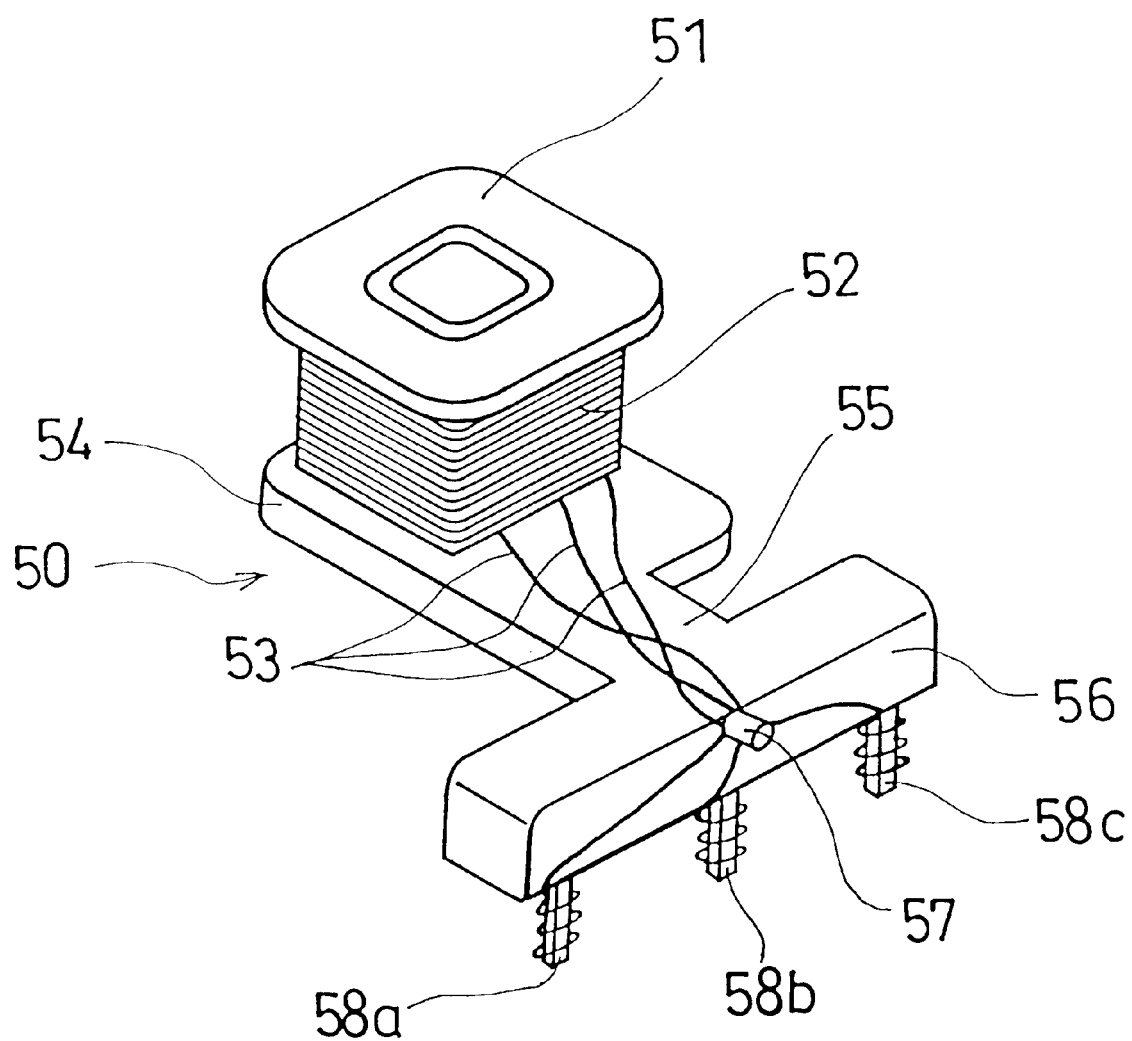
FIG. 7 is a perspective view of one example of a conventional bobbin with a terminal block.

In addition, with the prior art device shown in FIG. 7, the projection 57 is provided on the end of the terminal block 56, which makes the longitudinal dimension of the integration bobbin 50 larger, reducing a tolerance in dimension relative to a shutter of a floppy disk. Contrary to this, with the embodiment of the present invention, since the device is not provided with any projection required in the prior art device as above, there is no problem with the shutter of a floppy disk contacting the projection, which may happen in the prior art device. Thus, there is no risk of the magnetic head device 1 being damaged or the lead wires being broken.

Furthermore, since the narrow extension 9 of the bobbin proper 15 fits in the slit 8 of the shield ring 7, the dimension of the slit 8 of the shield ring 7 can be minimized, whereby the influence by external noise can be preferably avoided. In addition, the terminal block 10 is disposed to be positioned outside the shield ring 7 resulting in that the dimension of the shield ring 7 or the dimension of the whole of the magnetic head device can be eventually made smaller.

Figure 6:
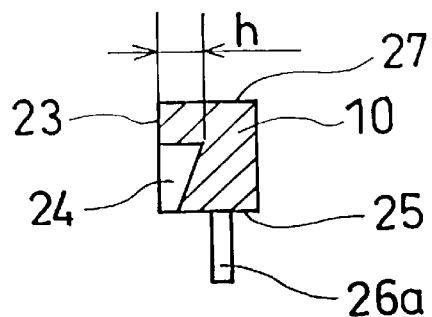
FIG. 6 is a cross-sectional view of a different type of a guide recess from what is shown in FIG. 5.

The depth of the guide recess 24 is described as being uniform from the inlet 29 to the outward face 25. However, as shown in FIG. 6, the depth may be set in such a manner as to gradually decrease from the inlet 29 toward the outward face 25, which will improve the rigidity and strength of the terminal block 10 at the outward face 25 compared with the case where the depth is set as being constant as h throughout the length thereof. Moreover, the pull strength of the terminal pins 26 can also be improved.

And, in the embodiment the width of the guide recess 24 increases gradually from the inlet 29 toward the outward face 25, is substantially equal to the longitudinal dimension of the terminal block 10 at the outward face 25. But, for example, the three terminal pins 26 are disposed closer to each other so that the width of the guide recess 24 at the outward face 25 may be decreased. In addition, depending on cases, the width of the guide recess 24 may be set to be constant all the way from the inlet 29 to the outward face 25.

According to any of the first to sixth aspects of the present invention, the guide recess is formed in the terminal block for passing the lead wires of the coil, thereby preventing the lead wires from protruding from the terminal block. Moreover, since a projection employed in the prior art device is not provided on the terminal block, contact between the projection and the shutter of a floppy disk is eliminated, and therefore there is no risk of the magnetic head device being damaged or the lead wires being broken. Furthermore, since the lead wires are guided by the guide recess, the size of the magnetic head device can be made smaller compared with the prior art device in which the lead wires are guided by the projection.

According to the third aspect of the present invention, since the angle θ formed between the one side of the flange extension and the line segment connecting the point defined by the side line of the another flange in line with the first side of the flange extension intersecting with the end line of the another flange positioned toward the terminal block and the point defined by the bottom corner of the inlet of the guide recess toward the cutout is set so as to meet θ>tan$^{-1}$(b/a), where a is the length of the flange extension and b is the depth of the cutout 30, therefore the dimension from the first side of the flange extension to the intersection between the extension line of the end of the flange extension and the line segment is larger than the depth of the cutout and the lead wires can be guided to keep clear of the cutout, whereby a problem with the lead wires getting broken through contact with the shield ring can be eliminated when the narrow extension of the integration bobbin is fitted in the slit of the shield ring.

What is claimed is:

1. A magnetic head device in which a magnetic head core, a slider and a coil wound on a bobbin are disposed inside a shield ring, a flange extension having a predetermined length is provided on one flange of said bobbin with its width being substantially equal to a width of said one flange, a narrow extension is provided on an end of said flange extension with its width being smaller than said width of said flange extension, a terminal block to which lead wires of said coil are connected is formed at one end of said narrow extension in such a manner as to be integrated with said bobbin, said flange extension and said narrow extension, and in which said terminal block is disposed to be positioned outside said shield ring when said narrow extension of said bobbin is fitted in a slit in said shield ring, wherein said terminal block is of a substantially rectangular shape and has a guide recess for guiding said lead wires of said coil formed on its end face away from said narrow extension, and said terminal pins are provided on an outward face of said terminal block, which is a face of said one flange opposite to a face in contact with said coil, and a width of said guide recess is small at an inlet for introducing said lead wires and gradually increases toward said terminal pins, and said lead wires of said coil are connected to said terminal pins through said inlet in said guide recess.

2. A magnetic head device as claimed in claim 1, wherein said narrow extension is formed such that one side thereof is recessed from one side of said flange extension thereby defining a cutout while another side thereof is flush with another side of said flange extension, and an angle θ formed between said one side of said flange extension and a line segment connecting a point defined by a side line of another flange in line with said one side of said flange extension intersecting with an end line of said another flange positioned toward said terminal block and a point defined by a bottom corner of an inlet of said guide recess toward said cutout is set to satisfy θ>tan$^{-1}$(b/a), where a is a length of said flange extension and b is a depth of said cutout.

3. A magnetic head device as claimed in claim 1, wherein said guide recess has a depth of 0.1 mm to 0.5 mm.

4. A magnetic head device as claimed in claim 1, wherein a depth of said guide recess decreases gradually from said inlet for introducing lead wires toward said terminal pins.

5. A magnetic head device as claimed in claim 2, wherein a depth of said guide recess decreases gradually from said inlet for introducing lead wires toward said terminal pins.

* * * * *